United States Patent [19]
Alexander

[11] Patent Number: 5,460,460
[45] Date of Patent: Oct. 24, 1995

[54] SCISSORS LIFT DOCK LEVELER

[75] Inventor: James C. Alexander, London, Canada

[73] Assignee: The Serco Corporation, London, Canada

[21] Appl. No.: 203,302

[22] Filed: Mar. 1, 1994

[51] Int. Cl.⁶ .................................. E01D 1/00; B66F 3/24
[52] U.S. Cl. ........................ 14/71.3; 14/71.7; 187/269
[58] Field of Search ........................... 14/71.1, 71.3, 14/71.5, 71.7; 414/401, 495, 584; 182/141; 254/122; 187/269

[56] References Cited

U.S. PATENT DOCUMENTS

| | | | |
|---|---|---|---|
| 2,706,102 | 4/1955 | Cresci | 254/8 |
| 2,928,558 | 3/1960 | Bamford et al. | 214/1 |
| 3,220,585 | 11/1965 | McCartney et al. | 214/512 |
| 3,246,876 | 4/1966 | Larson | 254/122 |
| 3,259,369 | 7/1966 | Gridley | 254/122 |
| 3,579,696 | 5/1971 | Hecker, Jr. et al. | 14/71 |
| 3,623,617 | 11/1971 | Nemessanyi | 414/495 X |
| 3,728,753 | 4/1973 | Beckwith et al. | 14/71 |
| 4,221,280 | 9/1980 | Richards | 187/18 |
| 4,394,888 | 7/1983 | Clarke | 14/71.1 X |
| 4,403,680 | 9/1983 | Hillesheimer | 187/18 |
| 4,531,248 | 7/1985 | Swessel et al. | 14/71.3 |
| 4,662,021 | 5/1987 | Hagen et al. | 14/71.3 |
| 4,753,419 | 6/1988 | Johansson | 254/122 |
| 4,858,888 | 8/1989 | Cruz et al. | 254/122 |
| 4,995,130 | 2/1991 | Hahn et al. | 14/71.3 |
| 5,111,546 | 5/1992 | Hahn et al. | 14/71.7 X |

Primary Examiner—Ramon S. Britts
Assistant Examiner—James A. Lisehora
Attorney, Agent, or Firm—Sughrue, Mion, Zinn, Macpeak & Seas

[57] ABSTRACT

A dock leveler scissors lift system mounted in a pit having back and side walls. The scissors lift mechanism comprises first and second scissors arms mounted on a base frame, one of the arms pinned to the base for pivotal movement and the other of the arms is free to move relative to said base. Hydraulics are employed to raise scissors lift. The scissors lift mechanism further comprises an upper frame having a generally horizontal deck portion. Retractable pins are used to couple said scissors lift mechanism to the pit in the fully raised position. The a dock leveler deck assembly is pivotally mounted to the generally horizontal deck portion of the scissor lift mechanism, and hydraulics coupled to the scissors lift mechanism raises the deck assembly. The scissors lift mechanism includes lip keepers that in one position retain the leveler lip in the pendent position and in a second position support the outboard end of the leveler deck.

11 Claims, 5 Drawing Sheets

SCISSORS LIFT DOCK LEVELER

BACKGROUND OF THE INVENTION

This invention relates to material handling equipment and in particular to the combination of a dock leveler and scissors lift combined into an operative system. In particular, this invention pertains to a unique manner in which those two components are combined to reduce the overall height of the system and provide support to the outboard end of the deck during a variety of operations. Such a reduction in overall height is an important advantage in terms of the dimensions of the pit in which the unit is to be mounted and the ability to service a variety of vehicles having different bed heights. Secondly, given that such devices accomplish dual modes of operation, one as a dock leveler and the second as a lifting table, support for the unit throughout all modes of travel including, below dock operation is a necessity. This invention thus relates to a combined system which permits the device to operate both as a lifting table and as a dock levelers incorporating the advantageous features of both.

The use of dock levelers at loading dock facilities is now well established. Those devices employ a deck which is generally hinged at one edge to a stationary frame mounted in a pit at the dock. The opposite or outboard end has a lip which is hingedly connected to an end of the deck. The deck is pivoted between an upwardly inclined position above the dock platform surface and a lower position which is below dock level. This ability to pivot both above and below the horizontal, cross-traffic, position allows the dock leveler to facilitate movement of goods to and from a vehicle irrespective of the height differential between the bed of the vehicle and that of the dock.

The lip, hinged to the front edge of the deck is movable from a pendant position to an extended position for purposes of bridging the gap between the rear edge of the bed of the vehicle and the front edge of the deck. Typical of such dock levelers are those found in U.S. Pat. Nos. 3,579,696, 3,669, 601 and 3,728,753.

A second condition of dock loading occurs where material on the loading dock must be transferred to the roadway or vice-versa. Typically, in this situation a variety of devices have been used such as lift tables. These devices are essentially scissors lift platforms having a very low stored height yet, possess the ability to elevate and transfer heavy loads to a dock position. Some of these tables also incorporate a lip to act as a ramp for transfer between the table deck and the ground while in the lowered stored position. Typical are the scissors lift mechanisms found in U.S. Pat. Nos. 2,706,102, 2,928,558, 3,220,585, 3,246,876 and 3,259,369.

Efforts have been made to combine the features of dock levelers with those of lift tables into a combined unit. Typical is the subject matter disclosed in U.S. Pat. Nos. 4,995,103 and 5,111,546. Such devices tend to become very complex utilizing hydraulic and electronic controls and complicated mechanical elements for purposes of decoupling the rear hinge of the dock leveler deck for purposes of achieving an extended range of below dock operation. Also, in order to meet the strength requirements of the dock leveler, which operates in essentially a cantilever mode, these devices have large and complex frames.

SUMMARY OF INVENTION

It is therefore an object of this invention to provide a loading dock system which effectively combines the best attributes of a dock leveler and scissors lift while reducing overall complexity by sharing framing elements.

Yet another object of this invention is to provide an improved combined dock leveler and scissors lift having an extended range of operation yet at the same time providing flexibility in operation of combined elements.

A further object of this invention is to provide a material handling system which is easy to operate, maintain, and does not require extensive modifications of existing loading dock structure.

These and other objects of this invention are accomplished in a device which combines a dock leveler deck and lip with a scissors lift having a deck portion planar to the dock leveler deck together with combination lip keepers and cross-traffic legs. The lip keepers are used to support the lip element of the dock leveler and the front of the leveler when in a leveler mode. The combination lip keepers and cross-traffic legs rotate to become cross-traffic legs when the device is operated in a scissors mode. This allows the lip to be extended when the deck is level even though it may be below the cross-traffic position.

Further, in accordance with this invention the frame of the scissors lift supports the dock leveler and is securely held at all positions to resist horizontal forces which are exerted by the movement of devices such as forklift trucks moving to and fro on the dock leveler.

These and other attributes of this invention will be described in greater detail by referring to the drawing and the description of the preferred embodiment which follows.

BRIEF DESCRIPTION OF THE DRAWING

To achieve a complete understanding of this invention, reference is now made to the accompanying drawings in which.

DESCRIPTION OF THE PREFERRED EMBODIMENT

Figure 1:
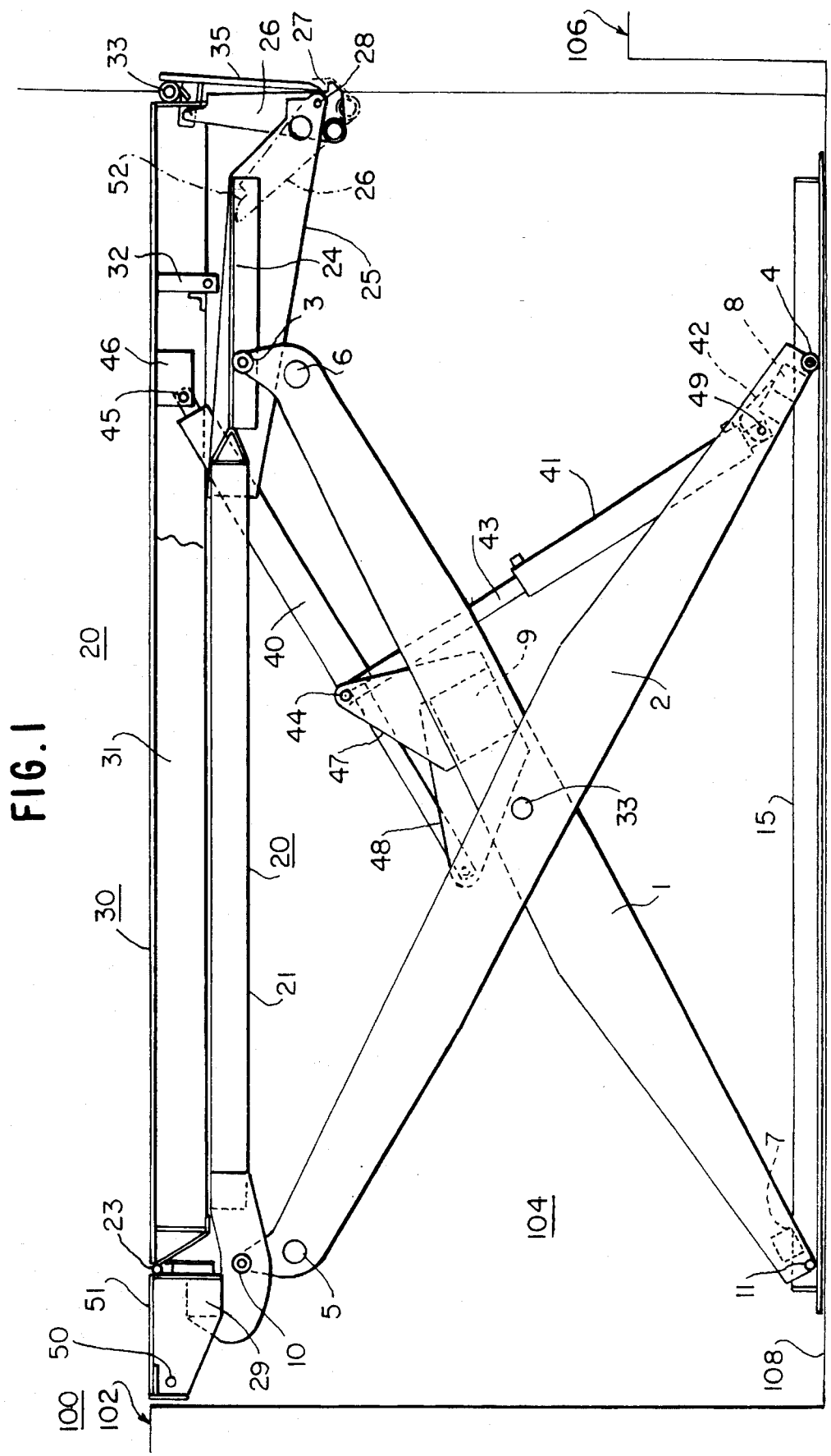
FIG. 1 is a side view of the device when elevated to dock level and operated in the dock leveler lift mode.
Figure 5:
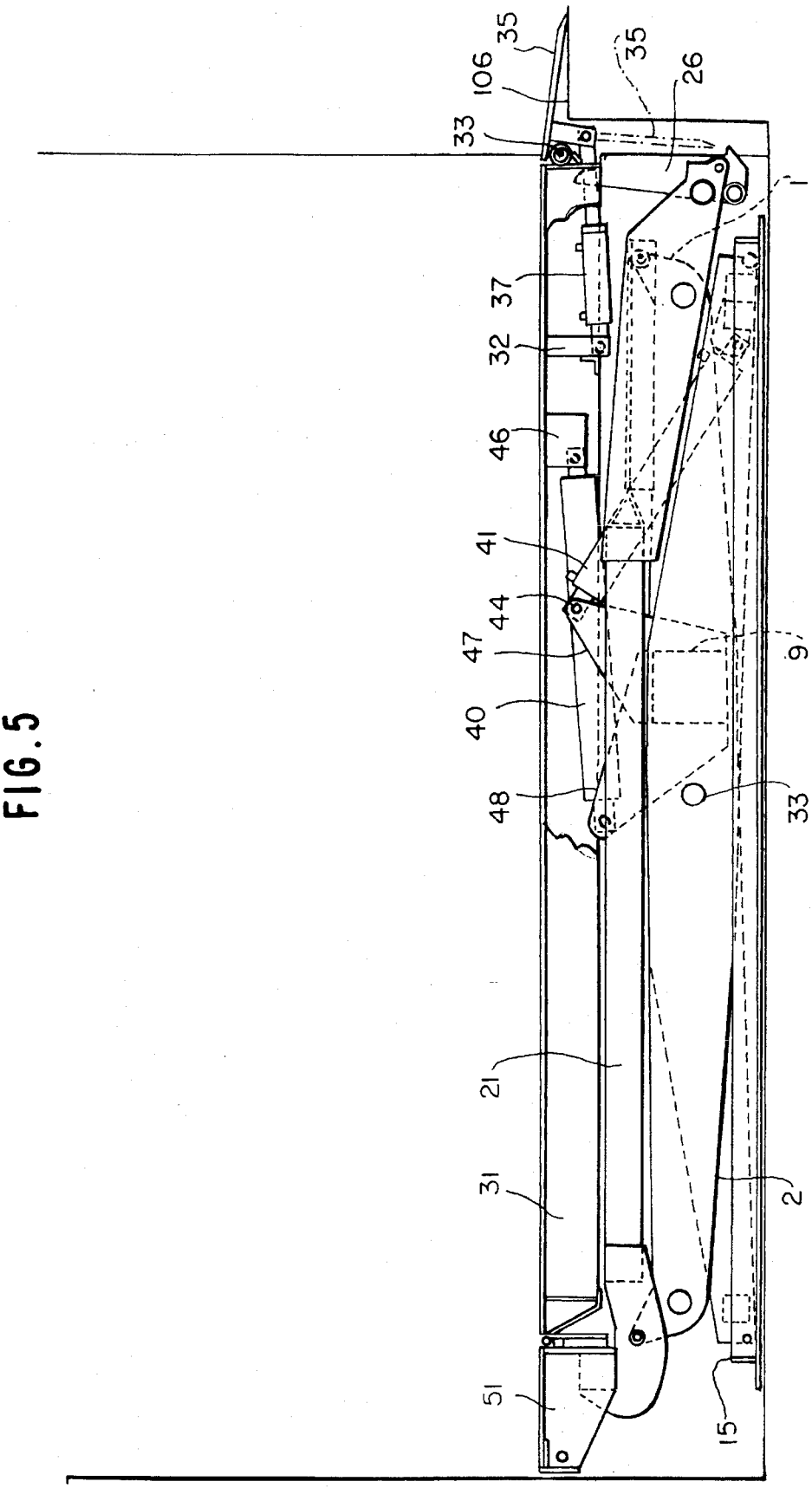
FIG. 5 is also a side view illustrating the device fully lowered in the scissors lift mode.

Referring now to FIG. 1 the essential aspects of this device will be illustrated. A loading dock 100 generally comprises a working level 102 and a pit 104. The depth of the pit 104 is a function of the distance from the internal dock floor to that of an external approach surface 106 plus the depth necessary to lower the device below the surface of the approach 106. That is, as illustrated in FIG. 5 the device is lowered so that the lip 35 is normally at a level consistent with that of the approach 106. This allows a transfer of heavy loads from the approach directly onto the deck for use of the device in a scissors lift mode. The pit is therefore typically below grade and therefore it will be appreciated that a reduction in the overall height of the device is important to reduce the pit depth.

In a typical installation, the dock height is approximately 50 inches, that is from the approach 106 to the dock level 102. Given that the device occupies approximately 24 inches when lowered, such requires a total pit depth of approximately 74 inches from the dock level 102 to the floor of the pit 108. The device also has the ability to lift above the dock level 102. Although the maximum lifting height is determined by the scissors lift design, it is usually limited to less than 60 inches to avoid the more restrictive regulations applied to elevating devices by many states.

Figure 3:
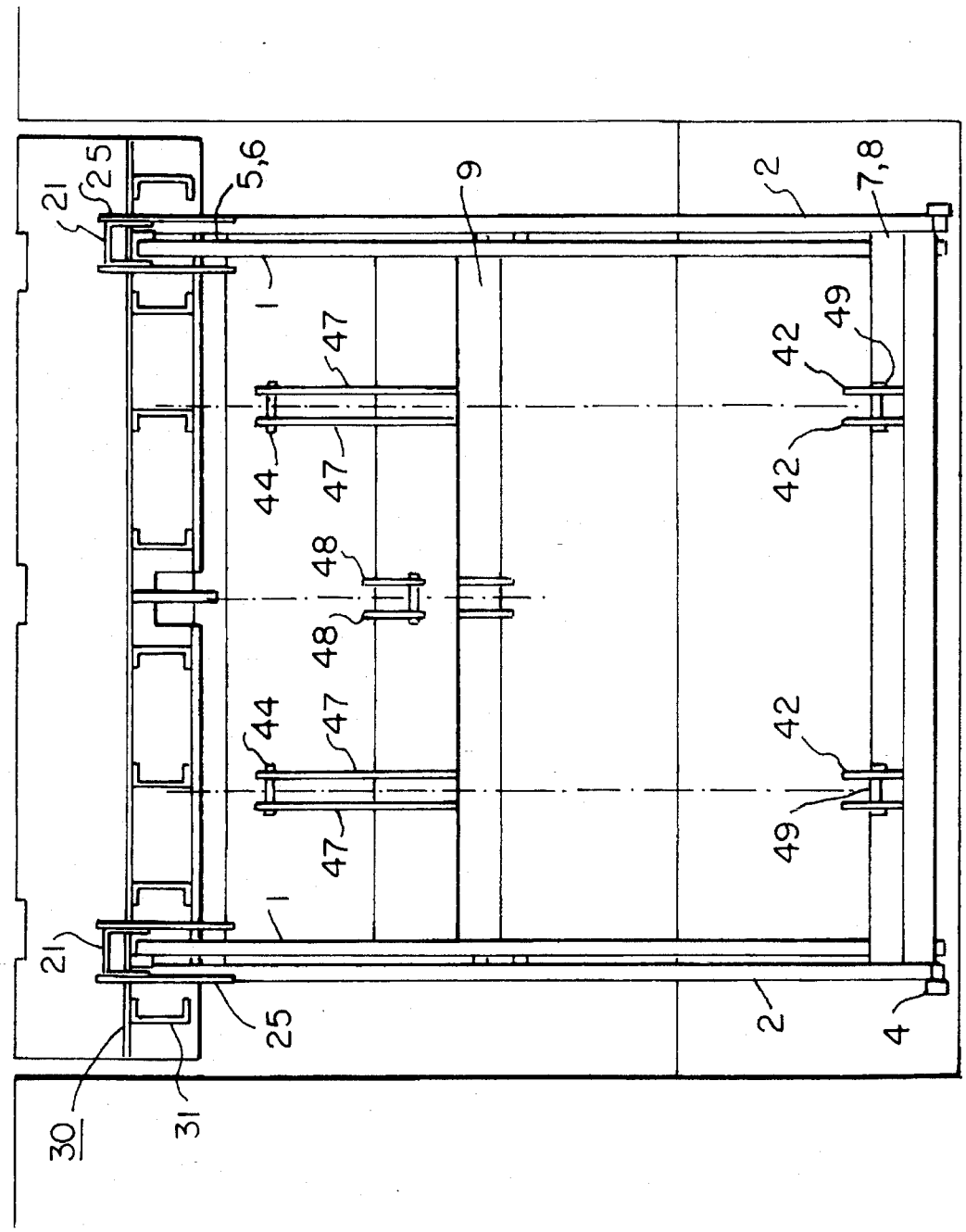
FIG. 3 is a sectional front view of the device illustrating how the scissors legs fit between the beams of the dock leveler and the mounting locations for the actuating units.

The system comprises several major subsystems. The first is a scissors lift which comprises two pair of scissors arms 1 and 2. FIG. 1 in side view illustrates two arms, it being understood that the other two arms are positioned in parallel on the other side of the deck, see, FIG. 3. The scissors lift utilizes lateral torque resisting members 5, 6, 7, 8 and 9. These are beams, either box or circular, spanning the distance between opposite parallel arms as illustrated in FIG. 3. The lift table is powered by hydraulic cylinders 41. FIG. 3 illustrates the mountings in the form of lower flanges 42 mounted on the member 8 and upper flanges 47 mounted on member 9. Pins 44 and 49 allow the cylinder to rotate as the lift table extends. It will be understood, that the torque resisting members are conventional elements and that the hydraulic pumps, motors and controls also standard are not illustrated.

The second major subsystem comprises the dock leveler unit. In place of a typical scissors lift top table, the upper ends of the scissors arms 1 and 2 support a modified frame assembly 20. In a typical dock leveler, the deck pivots about hinge pins at its inner end which couple it to a frame which is in turn fixed to the pit. In this invention, the deck 30 portion of the leveler pivots about pins 23 which couple it to a deck portion 51 of the lifting table. That is, as illustrated in FIG. 1 the lifting table frame has a deck portion 51 that is supported by the framing 29 of the lift table. That deck portion moves only vertically as a function of movement of the legs 1 and 2.

Figure 4:
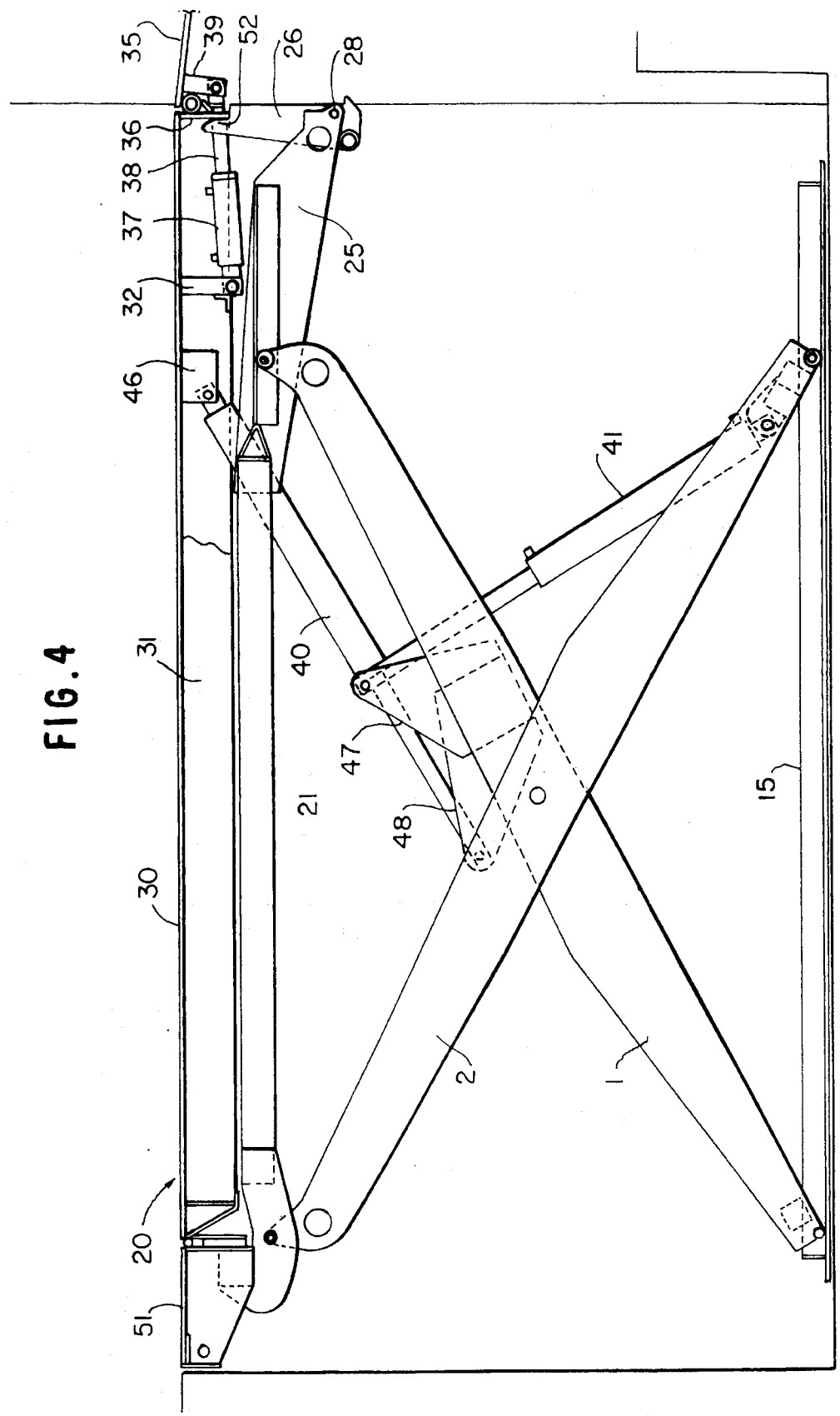
FIG. 4 is a side view of the system elevated to dock level illustrating operation in the scissors lift mode with the cross-traffic legs supporting the leveler deck.

A lip 35 is hingedly connected to the front portion of the deck 30 by means of hinges 33. The leveler deck 30 is powered by a conventional hydraulic system utilizing a main hydraulic cylinder 40. The lip cylinder actuator 37, 38 is illustrated in FIG. 4.

The scissors lift portion employs pins 10 and 11 to allow the rear portions of arms 1 and 2 to pivot respectively on sub carriage 29 of the lift frame and the base frame 15. Both of those frame elements are components of the scissors lift subsection. The front end of arms 1 and 2 are supported by rollers 3 and 4. Roller 3 rides on a horizontal track 24 which is attached to the end of horizontal frame member 21 and supported between two side plates 25. Roller 4 rides on the track of the base frame 15.

Cross-traffic legs 26 pivot on pins 28 which pass through holes in the plates 25. The legs are thus mounted to the frame of the scissors lift. They have at one end hook-shape projections 27 which serve as lip keepers to support the lip 35. FIG. 1 illustrates this position. There is a second position illustrated in FIGS. 1 and 4 where the leg 26 has a detent 52 which engages the header plate 36 of the leveler deck to provide support. Thus, as illustrated in FIG. 4, the front of the dock leveler is maintained horizontal at dock level. The legs 26 are held in position by hydraulic cylinders, not illustrated.

As illustrated in FIG. 1 then, the scissors legs 1 and 2 pivot about a common point 33 to achieve scissors action. The rear end of each of the legs 1 and 2 is fixed by means of pins 10 and 11. The horizontal extension of the legs as a function of scissors action is thus accommodated by means of rollers 3 and 4. The extension is accomplished by means of the hydraulic cylinders 41 having their cylinder portions pinned to the leg 2 at point 49 on the flanges 42 mounted to torque resisting member 8.

The piston extension 43 is coupled to the plates 47 by a pin 44 thereby coupling it to the arms 1 via the box beam 9. FIG. 1 illustrates the scissors lift mechanism raised to dock level position. By contraction of the piston 43 into the cylinder 41 the device is lowered. The full contracted position is illustrated in FIG. 5.

The hydraulic cylinder 40 used to pivot the deck 30 is coupled at one end via pin 45 to an under deck plate 46. The piston 47 is coupled via plate 48 to the scissors lift box beam assembly 9. It is apparent that the dock leveler power and the scissors lift power units may be combined in a single power unit having its fluid systems controlled by appropriate valves.

The rear frame of the dock leveler must be held securely to resist horizontal forces exerted by a forklift truck moving from dock level 102 onto the deck 30. Pins 50 extend outward from the deck portion 51 to engage holes positioned at the side of the pit wall. The pins 50 may be extended by means of hydraulics or the like. Once secured to the pit side wall, the lift frame is secured to eliminate horizontal and vertical motion of the frame elements.

Consequently, as can be seen in FIG. 1, the legs 1 and 2 and the subframe 20 of the scissor lift provide the necessary support for the dock leveler component. At the same time, the deck portion 51 of the lift table is stabilized to permit pivoting action of the deck 30. The deck 30 is raised and lowered via the hydraulic cylinder 40 to extend the range of the leveler above or below dock level. The end of the leveler deck 30 pivots at pin 23 which is supported by the scissors lift deck 51 and beam 21 mounted to cross member 29 and the arm 2. The deck plate 51 in this mode acts as an extension of the dock floor to bridge the distance to the dock 102 and the mounting point for hinge 23 by which pivoting action occurs of the leveler deck 30. In order to free the lip from the lip keeper projection 27 (see FIG. 1), the leveler is slightly raised to separate the lower portion of the lip 35 while still in a pendant position.

Consequently, as will be explained herein in greater detail the dock leveler and lift table move as a unitary mechanism in a vertical direction for scissors lift operation. When the device is used as a dock leveler they remain hinged together without the requirement of decoupling the lift table from the dock leveler to achieve independent motion. This is a material simplification in the system over other prior art devices.

Figure 2:
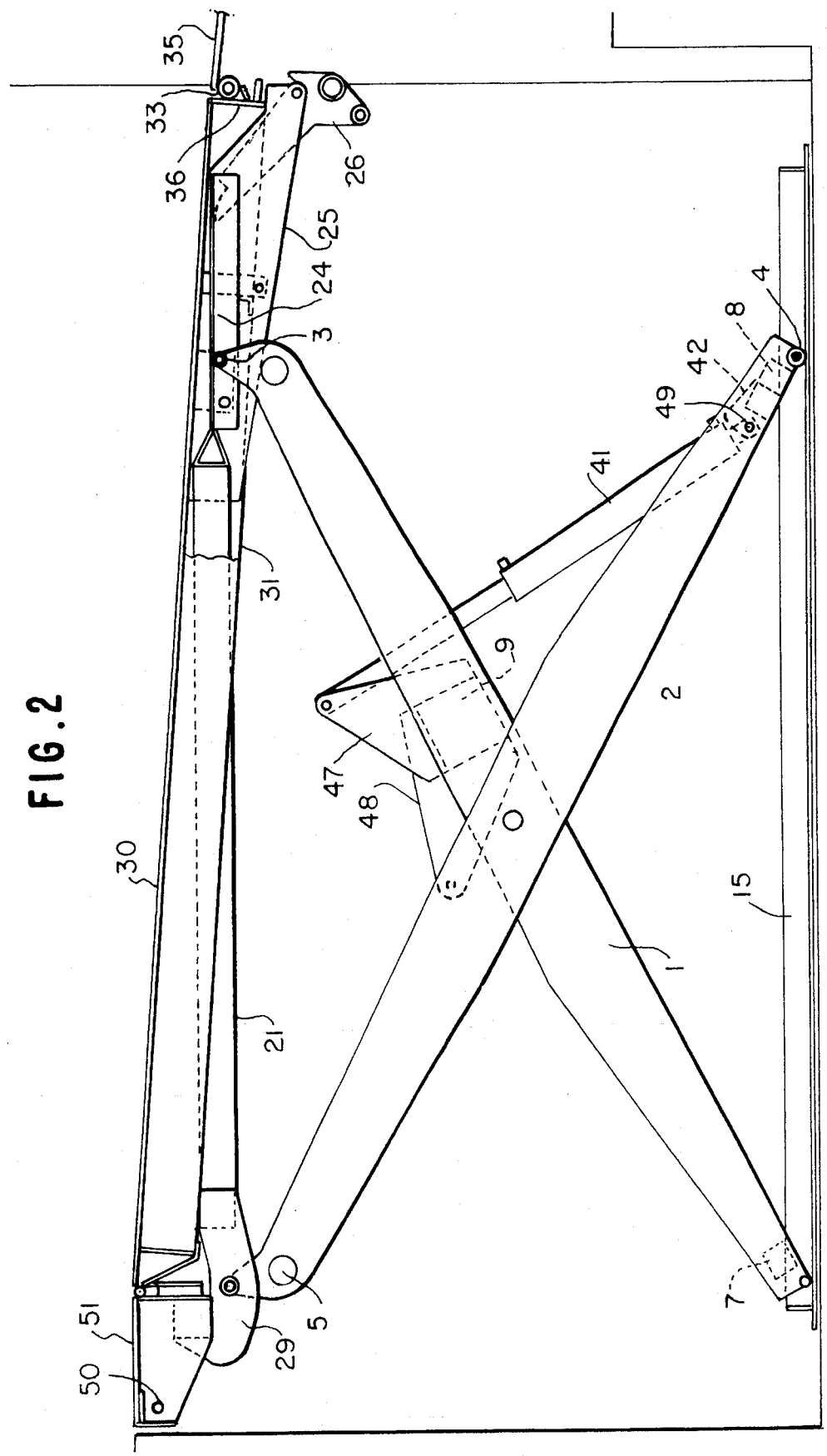
FIG. 2 is a side view of the device having its front end depressed below dock level and pivoting into the normal working range.

Referring now to FIG. 2 dock leveler operation is depicted in a below dock mode. To simplify the figure elements which are not necessary to an understanding have been eliminated. As illustrated in FIG. 2, the under deck beams 31 of the leveler overlap the horizontal members 21 of frame assembly for the scissors lift. The lip 35 is shown in its extended position pivoting upward about pivot pin 33. In this mode of operation, dock leveler operation, the cross-traffic legs 26 straddle the plates 25 which attach the horizontal track plate 24 to the end of the horizontal member 21 . Typically the outboard end of the dock leveler is supported by the end of the lip 35 resting on the bed of a truck. But when the leveler deck 30 has been fully lowered, the outboard end is supported by the bottom edge of the header plate 36 resting on the upper surface of the end of the plates 25.

FIG. 3 illustrates in a sectional front view, portions of the assembly to illustrate the nesting of the ends of the beams 21 and plates 25 of scissor lift within the beams 31 of the dock leveler. The positioning of the flanges for mounting the cylinders are illustrated in this view.

FIG. 4 illustrates the device in a scissors lift mode. Comparing FIG. 4 to FIG. 2 it can be seen that the deck plate 51 is in actuality a portion of the scissors lift mechanism in that it remains horizontal irrespective of the operation of the device in either a scissors lift or dock leveler operation. As illustrated in FIG. 4, the lip 35 may be used although the device is lifted via the hydraulic cylinder 41. The deck portion is supported in turn via the legs 26 engaging the header bar 36.

In this mode of operation, the cross-traffic legs 26 are rotated forward to support the deck. Rotation occurs about pin 28. Specifically, the leg 26 rotates until the detent 52 engages the header plate 36 of the deck thereby supporting the outer end of the deck via the subframe 20.

FIG. 4 also illustrates cylinder 37 and piston 38 operably coupled to extend the lip 35. The piston 38 is coupled to the lip 35 via a tab 39 while the cylinder itself is attached to an under frame member 32 of the deck.

Referring now to FIG. 5 the device in its fully lowered position is illustrated. Such is defined as a scissors lift mode with the front of the deck supported by the legs 26. The lip 35 may be extended on to the approach 106 to provide transfer of vehicles or cargo on to the deck, or it may be retracted in a pendant position. It is noted that the lip 35, while pendant, is not maintained in the lip keeper. Given the overlapping relationship between the legs 2 and plates 25 of the deck leveler frame 21 the assembly fully nests with the hydraulic cylinders 40 and 41 in the fully retracted position.

It is apparent that modifications of this system may be made without departing from the essential scope thereof. For example, the scissors lift mechanism as defined in the preferred embodiment employs symmetrical arms. Such is used to keep the deck level while providing vertical motion. However, unsymmetrical arms can be used to achieve a lower folded height.

This would be done by modifying one of the arms, for example, the front arm 2 to move the roller to a position slightly lower than that of the rear pivot pin. Such a technique would allow the front of the arm and the frame to be lowered thereby reducing the collapsed height. Such would also allow an increase in below dock travel of the deck assembly. While the result would normally be a non-linear motion of the front of the scissors lip, such could be compensated by the use of a cam shape on the roller track 24 at the front of the frame 20. While the use of a curved or arcuic shape as opposed to the linear shape on the roller track 24 would add a degree of complexity to the construction of the frame, this change would also have the additional benefit of permitting a lowered stored, collapsed configuration.

Moreover, illustrated in FIGS. 1 and 3 elements 5 and 6 are cross tubes to couple each of the corresponding arms 1 or 2 together. That is, as illustrated in FIG. 3, there are four arms, a pair of cross arms 1, 2 on one side of the lift table and a second pair on the opposite side. At the upper end each pair is connected to its opposite corresponding arm by means of cross tubes 5 or 6. At the bottom, rectangular cross members 7 and 8 also tie the unit together. It will be apparent that other bracing arrangements may be employed or that some of these elements may be eliminated depending on the load carrying capacity of the device.

The cross member 9, which is attached to the inner arm 1 and has a pair of tabs or plates which come off of that element. They are illustrated in FIG. 1 as elements 47 and 48. Those plates respectively serve as mountings for the respective hydraulic cylinders. While illustrated as separate elements, these members can be constructed as a unitary assembly.

Referring again to FIG. 3 the mountings for the hydraulics are illustrated. The hydraulic cylinder 41 comprises two parallel cylinders. Each are mounted by a pair of plates 47 to provide an anchor at arm 1. Consequently, parallel hydraulic cylinders are mounted on the arm using plates 47. The cylinder section is mounted similarly by plates 49, coupled to the cross members 8 via plates 49. The hydraulic cylinder 40 is mounted on a pair of plates 48 coupled to the cross member 9. This is illustrated in FIG. 3. FIG. 3 thus illustrates two cylinders 41 used to raise the scissors mechanism. The placement of the units may vary as well as the number. For example, dual hydraulics are employed for the scissors lift, but in some situation a single unit may be sufficient. The placement would vary to avoid torques in the system.

Referring now to FIGS. 1 and 2, the operation of the cross-traffic leg 26 with lip keeper which serves a dual function of supporting the deck is illustrated. The sideview of FIG. 1 illustrates one such leg but, in actuality, as illustrated in FIG. 3, there are two such units, one on each side of the deck 30. Specifically, plates 25 on the end of each beam 20 serve as mountings for the leg 26. The leg is mounted outside the plate 25 and thus is free to pivot in either direction about pivot point 28 without interference with the plate 24.

FIG. 1 illustrates one rectangular beam 21 but, as illustrated in FIG. 3, two such parallel upper beams are present. Moreover, while FIG. 1 illustrates the linking plate 29 (of which there are two) which serves as a coupling between the box frame 21 and a corresponding cross member on the upper deck portion 51, it is apparent that the rectangular member 21 may be extended and directly tied into cross member 29. That is, the beam 21 can directly brace the cross member 29.

FIG. 1 illustrates the device in the dock leveler mode. In this mode of operation the pin 50 locks the scissors lift deck section 51 into engagement with the side of the pit. So long as the device is operated in dock leveler mode (see FIG. 2) this scissors lift deck section is locked in place. Thus, even as illustrated in FIG. 2 where the deck assembly 30 of the dock leveler portion is declining, with the lip 35 extended, it can be seen that the deck portion 51 of the scissors lift maintains its horizontal orientation.

When the device is operated in a scissors lip mode, for example, in FIG. 4, or in the nested position of FIG. 5 the pin 50 is retracted to allow the unit to move vertically within the pit. In this mode of operation the deck portions 31 and 51 both move vertically.

While the construction and operation of this system has been described in conjunction with the preferred embodiment and modifications thereof, this invention is not so limited and is defined by the claims that follow.

Having defined my invention, I claim:

1. A dock leveler scissors lift system comprising;

a pit having back and side walls, a scissors lift mechanism comprising, a base frame, first and second scissors arms mounted on said base frame, one of said arms pinned to said base frame for pivotal movement and the other of said arms free to move relative to said base frame, means to raise said scissors lift mechanism, said scissors lift mechanism further comprising an upper frame having a generally horizontal deck portion movable with said scissors lift mechanism, means to couple said scissors lift mechanism to said pit, a dock leveler deck assembly pivotally mounted to said generally horizontal deck portion of said scissor lift mechanism, and means coupled to said scissors lift mechanism and to said deck assembly for raising and lowering said deck assembly.

2. The dock leveler scissors lift system of claim 1 further comprising a lip pivotally connected to said deck assembly, a plate mounted on said upper frame and movable between a position restraining said lip in a pendent position and a position supporting said deck assembly of said dock leveler.

3. The dock leveler scissors lift system of claim 1, wherein said means to couple said scissors lift to said pit comprises a pin mounted in said deck portion of said upper frame, said pin extendable to engage a side wall of said pit.

4. The dock leveler scissors lift system of claim 1, wherein said upper frame comprises a frame member coupling the other of said scissors arms to said generally horizontal deck portion for pivotal movement and a side plate having a horizontal track plate, and said one of the scissors arms free to move relative to said horizontal track plate and provide support for said upper frame.

5. The dock leveler scissors lift of claim 4 further comprising a lip mounted for pivotal movement on said deck assembly, a cross-traffic leg mounted on said side plate to support said lip when said lip is in a pendent position and movable to support said deck assembly when said system is operated in a scissors lift mode with said deck assembly in a horizontal position.

6. The dock leveler scissors lift of claim 1 further comprising an under frame mounting on said deck assembly, wherein said means coupled to said scissors lift mechanism to raise and lower said deck assembly comprises an hydraulic cylinder mounted at one end to said one of said scissors arms and at another end to said under frame mounting on said deck assembly.

7. The dock leveler scissors lift of claim 1 further comprising a lateral torque restraining member mounted to said one of said scissors arms and wherein both said means to raise said scissors lift and said means to raise said deck assembly each have one member mounted to said lateral torque restraining member.

8. The dock leveler scissors lift of claim 1, wherein said generally horizontal deck portion of said scissor lift mechanism carries a hinge pin, said upper frame spaced from said dock leveler deck assembly to permit said deck assembly to pivot to a declining position overlapping said upper frame when said scissors lift mechanism is elevated.

9. A dock leveler scissors lift system comprising;

a pit having back and side walls, a scissors lift comprising, a base frame, first and second scissors arms mounted on said base frame, one of said arms pinned to said base frame for pivotal movement and the other of said arms free to move relative to said base frame, means to raise said scissors lift, said scissors lift further comprising an upper frame having a generally horizontal deck portion, means to couple said scissors lift to said pit, a dock leveler deck assembly pivotally mounted to said generally horizontal deck portion of said scissor lift mechanism, means coupled to said scissors lift and to said deck assembly for raising and lowering said deck assembly; a lip pivotally connected to said deck assembly, a plate mounted on said upper frame and movable between a position restraining said lip in a pendent position and a position supporting said deck assembly of said dock leveler.

10. A dock leveler scissors lift system comprising;

a pit having back and side walls, a scissors lift comprising, a base frame, first and second scissors arms mounted on said base frame, one of said arms pinned to said base frame for pivotal movement and the other of said arms free to move relative to said base frame, means to raise said scissors lift, said scissors lift further comprising an upper frame having a generally horizontal deck portion, means to couple said scissors lift to said pit, a dock leveler deck assembly pivotally mounted to said generally horizontal deck portion of said scissors lift, means coupled to said scissors lift and to said deck assembly for raising and lowering said deck assembly, wherein said upper frame comprises a frame member coupling the other of said scissors arms to said generally horizontal deck portion for pivotal movement and a side plate having a horizontal track plate, and said one of the scissors arms being free to move relative to said horizontal track plate and provide support for said upper frame, a lip mounted for pivotal movement on said deck assembly, a cross-traffic leg mounted on said side plate to support said lip when said lip is in a pendent position and moveable to support said deck assembly when said system is operated in a scissors lift mode with said deck assembly in a horizontal position.

11. A dock leveler scissors lift system comprising;

a pit having back and side walls, a scissors lift comprising, a base frame, first and second scissors arms mounted on said base frame, one of said arms pinned to said base frame for pivotal movement and the other of said arms free to move relative to said base frame, means to raise said scissors lift, said scissors lift further comprising an upper frame having a generally horizontal deck portion, means to couple said scissors lift to said pit, and a dock leveler deck assembly pivotally mounted to said generally horizontal deck portion of said scissors lift, and means coupled to said scissors lift and to said deck assembly for raising and lowering said deck assembly, wherein said generally horizontal deck portion of said scissors lift carries a hinge pin, said upper frame spaced from said dock leveler deck assembly to permit said deck assembly to pivot to a declining position overlapping said upper frame when said scissors lift is elevated.

* * * * *